United States Patent [19]

Keske

[11] 4,030,377
[45] June 21, 1977

[54] ROTARY DRIVE ASSEMBLY
[75] Inventor: Frank E. Keske, Chillicothe, Ill.
[73] Assignee: Caterpillar Tractor Co., Peoria, Ill.
[22] Filed: June 28, 1976
[21] Appl. No.: 700,273
[52] U.S. Cl. .......................... 74/412 R; 74/421 R; 74/434; 74/715
[51] Int. Cl.² ...................... F16H 1/02; F16H 1/12; F16H 55/04; F16H 1/38
[58] Field of Search ............ 74/713, 715, 412, 421, 74/714, 434, 710, 710.5, 711

[56] References Cited
UNITED STATES PATENTS 3,237,483   3/1966   Kelley et al. .......................... 74/715

Primary Examiner—Leonard H. Gerin
Attorney, Agent, or Firm—Wegner, Stellman, McCord, Wiles & Wood

[57] ABSTRACT

A rotary drive assembly wherein a shaft is retained within a pinion against axial displacement therefrom by a projection on the shaft received in an annular recess in the pinion. The projection is forcibly urged axially from one end of the pinion bore therethrough into alignment with the recess whereupon the enlargement effectively locks the shaft to the pinion. Bearing portions may be provided on the shaft to be disposed outwardly of the opposite sides of the pinion for journaling the assembled shaft and pinion in suitable bearings. One bearing portion may be larger than the pinion bore so as to limit the relative movement therebetween. The bearing adapted to journal the larger bearing portion of the shaft is arranged to pass the shaft enlargement freely therethrough during assembly of the shaft to the pinion.

14 Claims, 2 Drawing Figures

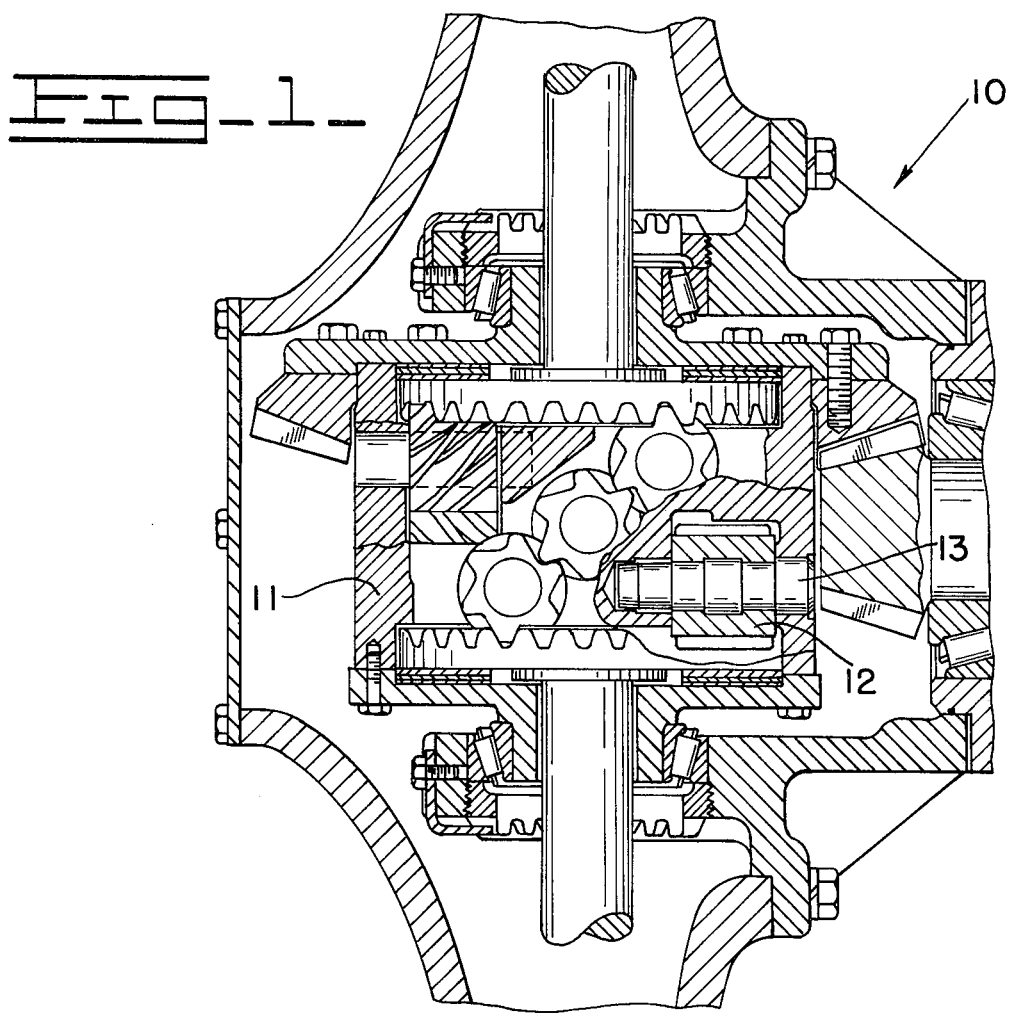
Fig_1_
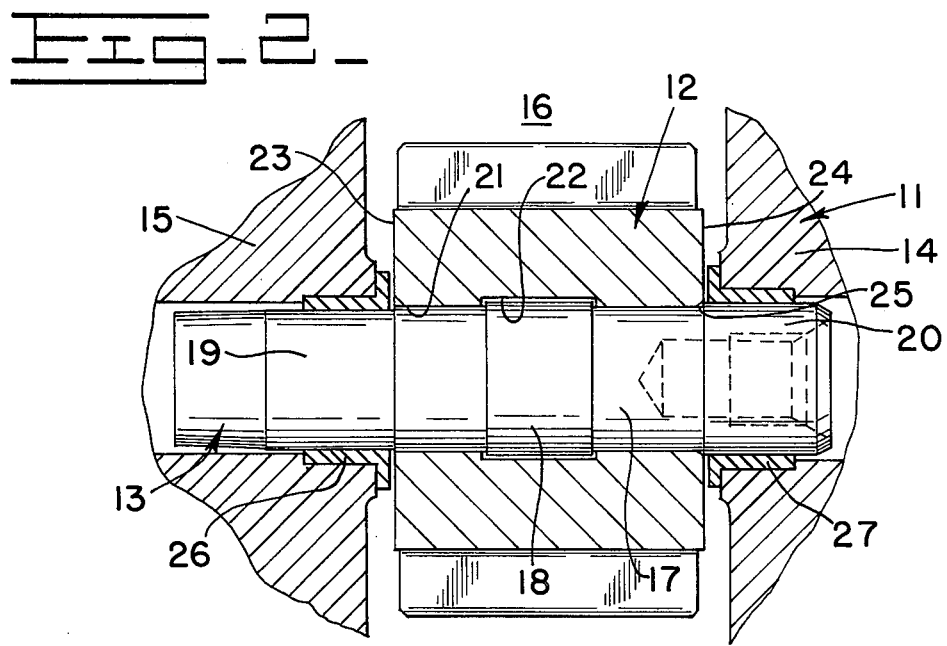
Fig_2_

ROTARY DRIVE ASSEMBLY

BACKGROUND OF THE INVENTION

1. Field of the Invention

This invention relates to rotary drive assemblies and in particular to means for assembling a shaft to a pinion or the like.

2. Description of the Prior Art

In one conventional form of assembling a shaft to a drive component, such as a pinion of a drive assembly, a pinion shaft has been press-fitted to the pinion after the pinion is positioned in the carrier. The strength of the pinion member limits the amount of interference permissible and it has been found that in a number of such installations the pinion shafts have worked free of the pinion notwithstanding the interference fit.

SUMMARY OF THE INVENTION

The present invention comprehends an improved rotary drive assembly wherein the shaft is retained in substantially axially fixed relationship to the pinion by means of an annular enlargement on the shaft projecting into an annular recess in the pinion bore intermediate the outer ends of the bore.

The annular enlargement may be forced through the pinion bore into alignment with the annular recess so as to thereupon effectively key the shaft to the pinion.

In the illustrated embodiment, the enlargement on the shaft comprises an annular enlargement which may have an axial extent slightly less than that of the annular recess so as to provide a desired fit therein.

In the illustrated embodiment, either or both of the recess and enlargement may be rectangular in cross section.

The pinion bore may be provided with an outwardly widening end portion for facilitated insertion of the shaft enlargement therethrough. In the illustrated embodiment, the bore is provided with a frustoconical tapered end portion.

The shaft may have portions of different diameter permitting facilitated installation. Thus, one end of the shaft may have a bearing portion of reduced diameter and the opposite end of the shaft may have a bearing portion of increased diameter. The bearing for rotatably journaling the increased diameter portion of the shaft is adapted to pass the shaft enlargement freely therethrough.

In the illustrated embodiment, the portion of the shaft of increased diameter may have a diameter substantially equal to that of the annular enlargement received in the pinion recess.

The improved drive assembly means of the present invention is adapted for facilitated installation of a shaft in a pinion wherein the pinion is firstly positioned in a housing. More specifically, the invention permits the installation of such a shaft into planet pinions of a torque-proportioning differential-type drive assembly.

Thus, the drive assembly structure of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a fragmentary section of a rotary drive assembly embodying the invention; and FIG. 2 is a fragmentary enlarged section illustrating in greater detail the assembly of the shaft to a planet pinion thereof.

DESCRIPTION OF THE PREFERRED EMBODIMENT

In the exemplary embodiment of the invention as disclosed in the drawing, a rotary drive assembly generally designated 10 is shown to include a housing portion 11 comprising a differential housing in which a pinion 12 is rotatably carried on a shaft 13. In the illustrated embodiment, the drive assembly defines a torque-proportioning differential, it being understood that the invention is applicable to other forms of drive assemblies wherein a shaft is pressed into a pinion retained in a suitable housing.

As best seen in FIG. 2, housing 11 includes a pair of spaced walls 14 and 15 defining therebetween a gear space 16. Pinion 12 is received in space 16 for rotation on shaft 13.

Shaft 13 includes a midportion 17 provided with a radially outwardly projecting portion 18, which, in the illustrated embodiment, comprises an annular enlargement disposed at the midportion of shaft portion 17.

The shaft further includes a first end portion 19 of reduced diameter and a second end portion 20 of increased diameter.

Pinion 12 is provided with an axial bore 21 having a radially inwardly opening annular recess 22 intermediate the opposite end faces 23 and 24 of the pinion. At one end, the bore is provided with an outwardly widening entrance portion 25.

A first bearing 26 is provided in housing wall 15 for journaling shaft portion 19, and a second bearing 27 is provided in housing wall portion 14 for journaling shaft portion 20.

In the illustrated embodiment, annular enlargement 18 and annular recess 22 may have a substantially rectangular cross section with the axial extent of enlargement 18 being slightly less than the axial extent of recess 22 to permit facilitated disposition of the enlargement 18 in the recess when the shaft is installed in the pinion.

Bearing 27 may have an inner diameter similar to that of the outer diameter of enlargement 18 so that the shaft enlargement may be readily passed through the bearing without damage thereto in the assembly of the shaft to the pinion.

In the assembly of the shaft 13 to pinion 12, bearings 26 and 27 are firstly installed in the housing walls 14 and 15 and the pinion 12 is then positioned in axial alignment with the bearings between walls 14 and 15.

With the small end portion 19 foremost, shaft 13 is then installed in the pinion by urging the shaft axially through bearing 27 until the small end portion 19 is disposed within bearing 26, as shown in FIG. 2. During this insertion, radial enlargement 18 passes freely through bearing 27 and is urged inwardly by its abutment with the flared surface 25, which, in the illustrated embodiment, may comprise a frustoconical outwardly widening surface, so as to permit its forcible urging through the bore 17 into alignment with recess 22 whereupon expansion of the constricted enlargement 18 into the recess may occur to effectively lock the shaft against axial displacement from the pinion in the position illustrated in FIG. 2.

In such disposition, the enlarged outer portion 20 of the shaft is aligned with bearing 27, and the reduced portion 19 is aligned with bearing 26 so as to permit proper journaling of the shaft and pinion assembly in the housing portion 11.

The amount of enlargement of portion 18 relative to the diameter of shaft portion 17 may be preselected to permit facilitated insertion of the enlargement through the bore portion 17 while yet providing a positive interlock of the shaft to the pinion when the projection is received in recess 22. The preselected amount of the enlargement may vary with the size of the pinion and shaft assembly, as will be obvious to those skilled in the art.

In the illustrated embodiment, enlargement 18 is formed integrally with shaft 17, it being obvious to those skilled in the art that suitably secured annular band means may be utilized similarly.

The foregoing disclosure of specific embodiments is illustrative of the broad inventive concepts comprehended by the invention.

What is claimed is:

1. A rotary drive assembly comprising:
    a pinion having an axial bore having opposite ends and defining an annular recess intermediate said ends; and
    a shaft coaxially mounting said pinion and having an axially inner annular enlargement projecting into said bore and outer portion at axially opposite sides of said enlargement fitted in said bore axially outwardly from said recess.

2. The drive assembly of claim 1 wherein said shaft enlargement has an axial extent less than that of said annular recess.

3. The drive assembly of claim 1 wherein said recess is rectangular in cross section.

4. The drive assembly of claim 1 wherein said enlargement is rectangular in cross section.

5. The drive assembly of claim 1 wherein said bore is provided with an outwardly widening end portion.

6. The drive assembly of claim 1 wherein said bore is provided with a frustoconical tapered, outwardly widening end portion.

7. The drive assembly of claim 1 wherein said shaft is provided with an axially outer enlargement at one of said bore ends and having a radially outer dimension greater than the diameter of said one bore end.

8. The drive assembly of claim 1 wherein said shaft is provided with an axially outer annular enlargement having an outer diameter substantially equal to the outer diameter of said axially inner enlargement.

9. A rotary drive assembly comprising:
    a pinion having an axial bore having opposite ends and defining an annular recess intermediate said ends;
    a shaft coaxially mounting said pinion and having an axially inner annular enlargement projecting into said bore and outer portion at axially opposite sides of said enlargement fitted in said bore axially outwardly from said recess;
    an annular first bearing journaling a first bearing portion on said shaft axially outwardly of said pinion;
    an annular second bearing journaling a second bearing portion oppositely axially outwardly of said pinion, said first bearing portion of the shaft having a cross section smaller than the inner diameter of said second bearing for facilitated insertion of said first bearing portion therethrough in assembling the shaft to said portion; and
    support means for supporting said bearings in coaxially spaced relationship oppositely outwardly of said pinion bore.

10. The drive assembly of claim 9 wherein said support means includes a unitary housing case carrying said bearings.

11. The drive assembly of claim 9 wherein said bearings are spaced apart axially a distance substantially equal to the axial length of said pinion.

12. The drive assembly of claim 9 wherein the inner diameter of said second bearing is substantially equal to the outer diameter of said shaft annular enlargement.

13. The drive assembly of claim 9 wherein said shaft first bearing portion has a diameter smaller than that of said pinion bore.

14. The drive assembly of claim 9 wherein said pinion bore has a diameter smaller than that of said shaft second bearing portion.

* * * * *

UNITED STATES PATENT AND TRADEMARK OFFICE
CERTIFICATE OF CORRECTION

PATENT NO. : 4,030,377
DATED : June 21, 1977
INVENTOR(S) : FRANK E. KESKE

It is certified that error appears in the above-identified patent and that said Letters Patent are hereby corrected as shown below:

Column 4, line 26 (Claim 9, line 19), after "said" delete "portion" and correct to read --pinion--.

Signed and Sealed this

Sixth Day of December 1977

[SEAL]

Attest:

RUTH C. MASON
Attesting Officer

LUTRELLE F. PARKER
Acting Commissioner of Patents and Trademarks